(12) United States Patent
Sundholm

(10) Patent No.: US 9,310,012 B2
(45) Date of Patent: Apr. 12, 2016

(54) SLEEVE PART OF A PIPE JOINT AND A PIPE JOINT

(75) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 219 days.

(21) Appl. No.: 13/878,077

(22) PCT Filed: Oct. 19, 2011

(86) PCT No.: PCT/FI2011/050909
§ 371 (c)(1),
(2), (4) Date: Apr. 5, 2013

(87) PCT Pub. No.: WO2012/059631
PCT Pub. Date: May 10, 2012

(65) Prior Publication Data
US 2013/0193681 A1    Aug. 1, 2013

(30) Foreign Application Priority Data

Nov. 1, 2010 (FI) .................................. 20106144

(51) Int. Cl.
*F16L 47/03* (2006.01)
*B29C 65/78* (2006.01)
(Continued)

(52) U.S. Cl.
CPC ............... *F16L 47/03* (2013.01); *B29C 65/34* (2013.01); *B29C 65/3432* (2013.01); *B29C 65/3476* (2013.01); *B29C 65/7802* (2013.01);
(Continued)

(58) Field of Classification Search
CPC ....... F16L 41/008; F16L 41/082; F16L 47/03; F16L 47/02; F16L 47/32; B29C 65/342; B29C 65/3432; B29C 65/3468; B29C 65/362
See application file for complete search history.

(56) References Cited

U.S. PATENT DOCUMENTS 2,739,829 A    3/1956    Pedlow et al.
3,907,625 A    9/1975    Vogelsanger
(Continued)

FOREIGN PATENT DOCUMENTS

CN    2676001 Y    2/2005
EP    0183188 A2    6/1986
(Continued)

OTHER PUBLICATIONS

Japanese Office Action, dated Sep. 15, 2015, for Japanese Application No. 2013-537174, with an English translation.
(Continued)

*Primary Examiner* — Daniel Wiley
(74) *Attorney, Agent, or Firm* — Birch, Stewart, Kolasch & Birch, LLP

(57) ABSTRACT

Sleeve part of a pipe joint wherein the sleeve part includes a chamber space, into which the opposing butt ends of the pipe parts to be connected together are placed such that the sleeve part extends a distance from the point of connection of the pipe parts to be connected together on top of both pipe parts. The sleeve part includes heating member, such as resistance wires. As a consequence of the heating of the resistance wires a joint forms between the sleeve part and the pipe parts. An inspection aperture is formed in the sleeve part through the wall of the sleeve part from the exterior to the interior to a point where the positioning of the opposing butt end surfaces of the pipe parts to be connected together can be verified. The invention also relates to a pipe joint.

9 Claims, 1 Drawing Sheet

(51) Int. Cl.
*B29C 65/00* (2006.01)
*B29C 65/34* (2006.01)

(52) U.S. Cl.
CPC ......... *B29C66/1122* (2013.01); *B29C 66/1142* (2013.01); *B29C 66/5221* (2013.01); *B29C 66/5229* (2013.01); *B29C 66/73921* (2013.01); *B29C 66/91221* (2013.01); *B29C 66/97* (2013.01); *F16L 2201/10* (2013.01)

(56) References Cited

U.S. PATENT DOCUMENTS

| | | | | |
|---|---|---|---|---|
| 4,436,987 | A | * | 3/1984 | Thalmann et al. ............ 219/535 |
| 4,530,521 | A | | 7/1985 | Nyffeler et al. |
| 4,842,305 | A | | 6/1989 | Kistenich et al. |
| 4,906,313 | A | | 3/1990 | Hill |
| 4,994,655 | A | | 2/1991 | Handa et al. |
| 5,369,248 | A | * | 11/1994 | Dufour et al. ................. 219/541 |
| 5,824,179 | A | | 10/1998 | Greig |
| 6,164,702 | A | * | 12/2000 | Hauber et al. ............... 285/21.2 |
| 2007/0252383 | A1 | | 11/2007 | Tappe |

FOREIGN PATENT DOCUMENTS

| | | |
|---|---|---|
| JP | 55-106924 A | 8/1980 |
| JP | 2000-18470 A | 1/2000 |
| JP | 2002-213669 A | 7/2002 |
| JP | 2003-240180 A | 8/2003 |
| JP | 2003-343788 A | 12/2003 |
| JP | 2006-266465 A | 10/2006 |
| JP | 2010-210084 A | 9/2010 |
| RU | 2 115 057 C1 | 7/1998 |
| RU | 2 294 478 C1 | 2/2007 |
| WO | WO 2007/147298 A1 | 12/2007 |

OTHER PUBLICATIONS

Russian Decision on Grant, dated Jun. 9, 2015, for Russian Application No. 2013125449, with an English translation.

Australian Office Action for AU No. 201135075 dated Oct. 29, 2014.
China Office Action for CN 201180051420.7 dated Mar. 16, 2015.

* cited by examiner

SLEEVE PART OF A PIPE JOINT AND A PIPE JOINT

BACKGROUND OF THE INVENTION

The object of the invention is a sleeve part of a pipe joint as defined in the preamble of claim 1, which sleeve part comprises a chamber space, into which the opposing butt ends of the pipe parts to be connected together are placed essentially against each other such that the sleeve part extends a distance from the point of connection of the pipe parts to be connected together on top of both pipe parts, which sleeve part comprises heating means, such as resistance wires, as a consequence of the heating of which resistance wires a joint forms between the sleeve part and the pipe parts.

The object of the invention is also a pipe joint as defined in the preamble of claim 6.

Bushing joints are generally used for connecting together pipes, more particularly plastic pipes, end-on-end. The point of connection is placed into the bushing, i.e. into the sleeve part, such that the ends of the pipe parts to be connected together are inside the bushing and the bushing is thus around the point of connection extending some distance in the longitudinal direction of the pipes from the point of connection in both directions. The bushing part is provided with thermal resistors or corresponding, in which case when forming the joint electric current is conducted to the resistors, in which case the resistors heat up and a joint forms between the sleeve part and the pipe parts. The type of joint described has the problem, particularly when applied in the joints of the transfer pipings of pneumatic waste-transporting systems, that a gap or sill that is detrimental to the transportation of material can remain between the pipe parts to be connected. In prior-art solutions the bushing can contain a countersurface against which the pipe parts to be connected together should be placed, but in practical installation conditions installation errors that result in an unsatisfactory joint can remain in the placement of the pipes into the bushing. Thermoplastic pipe joints of the type described above are described e.g. in the publications U.S. Pat. Nos. 2,739,829, 4,530,521 and 4,906,313. Known from publication JP2003343788 is a solution wherein a transparent part is formed in the bushing, from which transparent part the ends of the pipes can be seen.

The purpose of this invention is to achieve a completely new type of solution for a pipe joint, by means of which the problems of prior-art solutions can be avoided. One important aim is to achieve a pipe joint solution applicable to the conveying pipings of pneumatic waste transporting systems. Yet another aim is to achieve an easily installable solution for a pipe joint, by means of which the point of connection can be inspected, even before welding, and to which measuring devices can easily and reliably be permanently or temporarily connected.

BRIEF DESCRIPTION OF THE INVENTION

The invention is based on a concept according to which an inspection aperture for the point of connection is arranged in the sleeve-like bushing part arranged around a joint.

The sleeve part of a pipe joint according to the invention is mainly characterized in that an inspection aperture is formed in the sleeve part through the wall of the sleeve part from the exterior to the interior to a point where the positioning of the butt end surfaces placed essentially against each other of the pipe parts to be connected together can be verified.

The sleeve part of a pipe joint according to the invention is also characterized by what is stated in claims 2-5.

The pipe joint according to the invention is characterized by what is stated in claim 6.

The pipe joint according to the invention is also characterized by what is stated in claim 7.

The solution according to the invention has a number of important advantages. By using a sleeve part according to the invention as a bushing and by using the inspection aperture arranged in said sleeve part, an extremely effective solution is achieved for inspecting the quality of a pipe joint in connection with its formation. Additionally, the aperture can be used as a machining point in forming the aperture needed for the installation of various sensors. A fixing point, such as threads, can be conveniently arranged in connection with the aperture for the fixing of various sensors or measuring devices. The aperture of the sleeve part can be further utilized e.g. for the internal visual inspection of a pipe when an aperture is formed from the aperture of the sleeve part through the wall of the pipe parts. In addition, the aperture of the sleeve part can easily be provided with a plug comprising a counterthread, which is suited to the threads of the protrusion part of the aperture of the sleeve part. From the inspection aperture an aperture through the walls of the pipe parts into the channel space of the pipe can be further formed. The aperture can be used e.g. for internal inspection of the pipes and/or of the pipe joint, e.g. with optical devices, such as with an endoscope or corresponding. The aperture can be used e.g. for measuring pressure or temperature. A measuring sensor can be disposed in the aperture or at least in medium connection with the aperture. A measuring sensor or other measuring means can be fixed into the sleeve, into the fixing means of the protrusion part of the aperture of the sleeve, by the aid of a suitable counterpart.

BRIEF DESCRIPTION OF THE FIGURES

In the following, the invention will be described in more detail by the aid of an example with reference to the attached drawing, wherein.

DETAILED DESCRIPTION OF THE INVENTION

Figure 1:
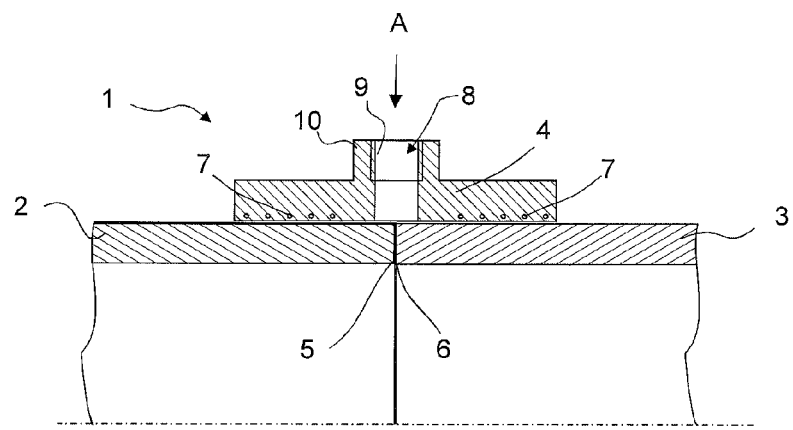
FIG. 1 presents a part of a sectioned pipe joint according to an embodiment of the invention.

The figures present a sectioned part of a pipe joint. FIG. 1 contains a cross-section of the top part of the pipe joint 1. In the joint two pipe parts 2 and 3 are connected together end-on-end, in which case the butt end 5 of the first pipe part 2 is against the butt end 6 of the second pipe part 3. The butt end sections of the pipe parts 2, 3 are arranged inside the bushing, i.e. inside the sleeve part 4. The sleeve part comprises resistance means 7, such as thermal resistance wires 7, which warm up when electric current is conducted into them. Connection points (not presented) that are per se prior art can be arranged in the sleeve part, which connection points are connected to the thermal resistance wires and to which connection points electric current is connected. As a consequence of the heating of the resistance wires 7, a joint forms between the sleeve part and the pipe parts in a manner that is per se known in the art. In the joining of thermoplastic pipes this is, per se, prior art. According to the invention, an inspection aperture 8 is formed in the sleeve part, which inspection aperture extends through the wall of the sleeve part from the outer surface to the inside surface of the sleeve part. The inspection aperture is arranged essentially at a point at which the opposing butt ends 5, 6 of the pipe parts 2, 3 to be connected together are face-to-face in the finished joint. In the embodiments of the figure a protrusion part 10 is arranged around the inspection aperture 8. According to one embodiment the protrusion part extends a distance from the inspection aperture 8 in the radial direction away from the aperture and outwards from the mainly cylindrical outer surface of the sleeve part. A fixing means, such as a threaded section 9, is arranged in connection with the inspection aperture. The threaded section can be an internally threaded section arranged in the wall of the aperture or an externally threaded section arranged in the protrusion part. The inspection aperture 8 can be provided with a plug (not presented). The plug can be fixed with counter means, such as with counterthreads, to the fixing means of the aperture, such as to the threaded section 9.

The inspection aperture 8 can be used most advantageously in the phase of forming the pipe joint to ensure the correct positioning of the pipe parts 2, 3 to be connected together, for forming a joint of good quality. From the inspection aperture 8 it can easily be detected whether there is an undesirable gap between the pipes, incorrect positioning or whether the pipes are not properly against each other. Thus by means of the invention the correctness of the position of the pipes to be connected can be verified before forming a joint.

Figure 2:
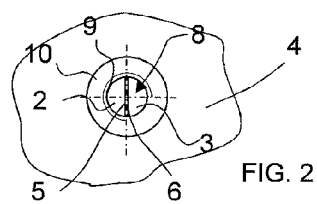
FIG. 2 presents a detail from FIG. 1, from the direction A.

FIG. 2 illustrates a situation in which the state of the joint is viewed from the direction A of FIG. 1 from the inspection aperture 8 of the sleeve part 4. FIG. 2 presents only one detail of the sleeve part 4. From the inspection aperture the butt end parts 5, 6 of the pipe parts 2, 3 are seen and whether the pipe parts 2, 3 are against each other in the manner desired.

Figure 3:
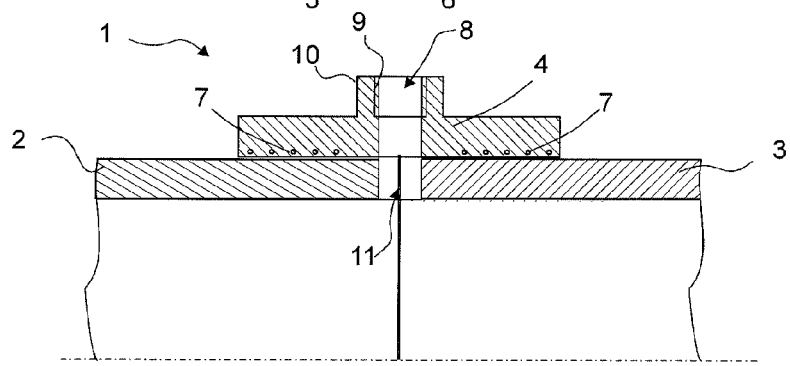
FIG. 3 presents a part of a sectioned pipe joint according to an embodiment of the invention.

According to FIG. 3 an aperture 11 through the walls of the pipe parts 2, 3 can be further formed from the inspection aperture into the channel space of the pipe. According to FIG. 3 the aperture 11 is formed only after the forming of the joint. The aperture 11 can be used e.g. for internal inspection of the pipes and/or of the pipe joint, e.g. with optical devices, such as with an endoscope or corresponding.

Figure 4:
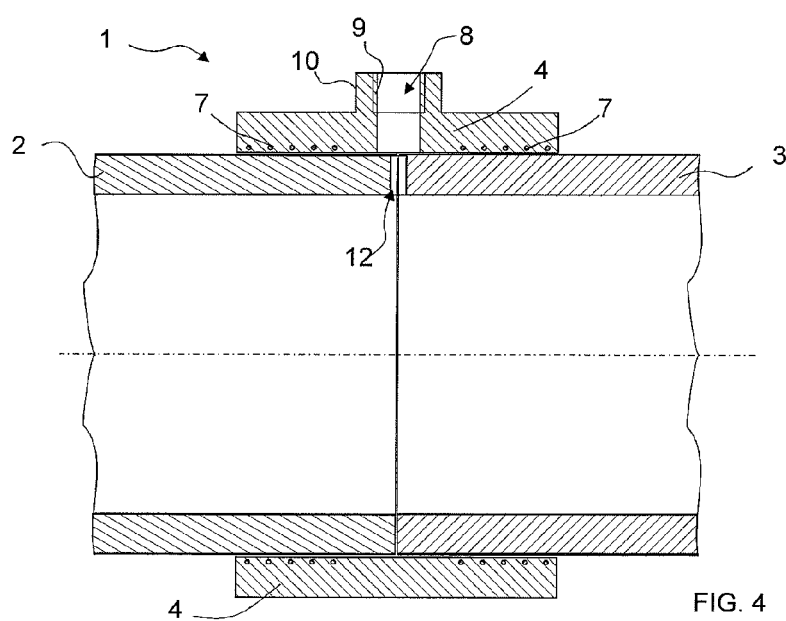
FIG. 4 presents a part of a sectioned pipe joint according to an embodiment of the invention.

FIG. 4 further presents a cross-section of a pipe joint 1 according to an embodiment of the invention. The extending of the sleeve part 4 around the pipe parts is seen from the figure. In the embodiment of the figures the sleeve part is mainly pipe-shaped and mainly ring-shaped, except for the protrusion part 10 that is in connection with the inspection aperture 8. In FIG. 4 an aperture 12, smaller in diameter than the inspection aperture, has been formed via the inspection aperture through the wall of the pipe parts into the channel space of the pipe. This second aperture 12 can be used e.g. for measuring pressure or temperature. A measuring sensor can be disposed in the aperture 12 or at least in medium connection with the aperture 12. A measuring sensor or other measuring means can be fixed into the sleeve 4, into the fixing means 9 of the protrusion part 10 of the aperture 8 of the sleeve, by the aid of a suitable counterpart.

The pipe joint according to the invention is very well suited for use in the joints of the conveying piping of pneumatic pipe transport systems for waste. The pipe sizes can be rather large in diameter, e.g. typically 200-500 mm.

The object of the invention is thus a sleeve part of a pipe joint 1, which sleeve part comprises a chamber space, into which the opposing butt ends 5, 6 of the pipe parts 2, 3 to be connected together are placed essentially against each other such that the sleeve part 4 extends a distance from the point of connection of the pipe parts 2, 3 to be connected together on top of both pipe parts 2, 3, which sleeve part 4 comprises heating means 7, such as resistance wires, as a consequence of the heating of which resistance wires a joint forms between the sleeve part 4 and the pipe parts 2, 3. An inspection aperture 8 is formed in the sleeve part 4 through the wall of the sleeve part from the exterior to the interior to a point where the positioning of the butt end surfaces 5, 6 placed essentially against each other of the pipe parts 2, 3 to be connected together can be verified.

According to one embodiment the inspection aperture 8 is arranged in the center area of the sleeve part 4.

According to one embodiment the inspection aperture 8 is arranged in the sleeve part 4 between the first pipe part 2 and the heating means 7 to be used for connecting the sleeve part 4 of it and the second pipe part 3 and the heating means 7 to be used for connecting the sleeve part 4 of it.

According to one embodiment a protrusion part 10 is arranged around the inspection aperture 8.

According to one embodiment, fixing means, such as a thread means or a threaded section 9, is arranged in connection with the inspection aperture 8.

According to one embodiment the inspection aperture 8 is fitted for the purpose of a measuring sensor, such as a temperature sensor or a pressure measuring sensor.

According to one embodiment after the forming of the joint, the inspection aperture 8 is used as the point from which an aperture 11, 12 is formed through the wall of the pipe or pipe parts 2, 3 into the flow channel of the pipe.

The object of the invention is also a pipe joint, which comprises a first pipe part 2 and a second pipe part 3 and a sleeve part 4 according to any of claims 1-5.

According to one embodiment the pipe parts 2, 3 are the conveying pipes of a pneumatic pipe transport system for wastes.

It is obvious to the person skilled in the art that the invention is not limited to the embodiments presented above, but that it can be varied within the scope of the claims presented below. The characteristic features possibly presented in the description in conjunction with other characteristic features can, if necessary, also be used separately to each other.

The invention claimed is:

1. A pipe joint, comprising
   a first pipe part;
   a second pipe part; and
   a sleeve part, said sleeve part comprising:
      a chamber space into which opposing butt ends of the first and second pipe parts are placed against each other at a point of connection;
      heating means disposed within opposing ends of the sleeve part for forming a fusion-melt joint between the sleeve part and the first and second pipe parts,
      an inspection aperture formed radially through a wall of the sleeve part from the exterior to the interior thereof to the point of connection where the positioning of the butt end surfaces of the first and second pipe parts can be verified, and
      a second aperture formed through a portion of each of the butt ends of the first and second pipe parts, wherein said portions of said butt ends are circumferentially aligned with said inspection aperture;
   wherein the inspection aperture is fitted with a temperature sensor or a pressure measuring sensor.

2. The pipe joint according to claim 1, wherein the inspection aperture is arranged in a center area of the sleeve part.

3. The pipe joint according to claim 2, wherein a protrusion part is formed around the inspection aperture.

4. The pipe joint according to claim 2, wherein the inspection aperture contains fixing means.

5. The pipe joint according to claim 1, wherein a protrusion part is formed around the inspection aperture.

6. The pipe joint according to claim 5, wherein the inspection aperture contains fixing means.

7. The pipe joint according to claim 1, wherein the inspection aperture contains fixing means.

8. A pipe joint according to claim 1, wherein the first and second pipe parts are conveying pipes of a pneumatic pipe transport system for wastes.

9. The pipe joint of claim 1, wherein the heat means are resistance wires.

\* \* \* \* \*